Sept. 22, 1953  H. W. G. HIGNETT ET AL  2,653,180
ALKALINE STORAGE BATTERY AND PROCESS
FOR PREVENTING ITS SELF-DISCHARGE
Filed June 7, 1952
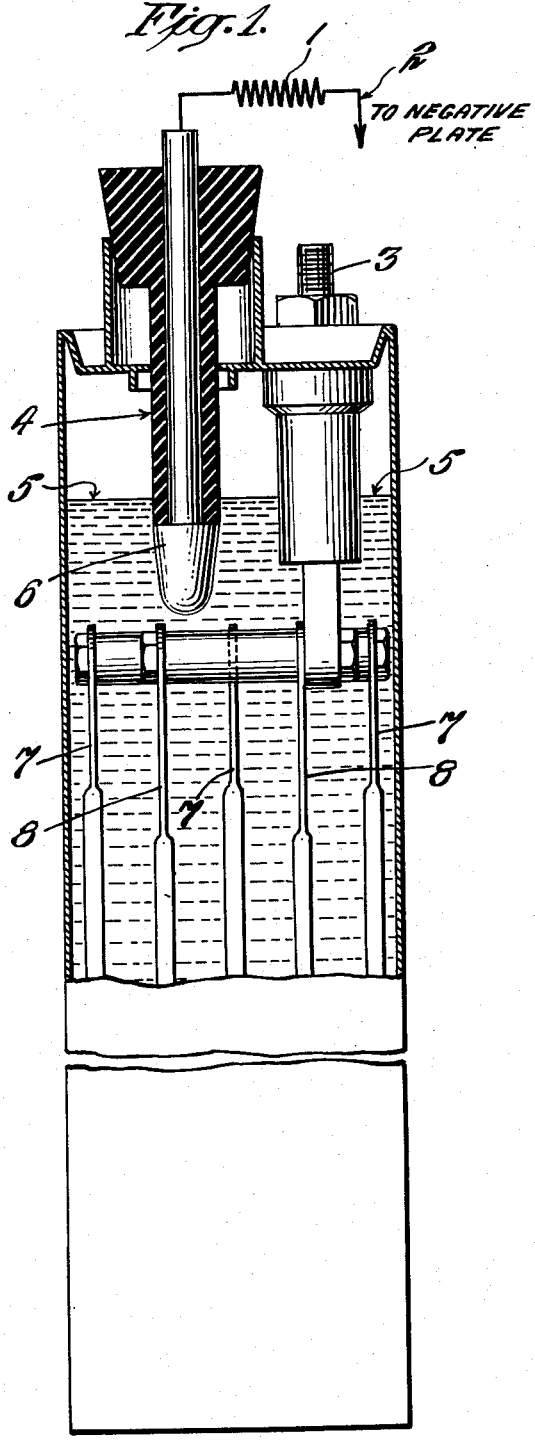
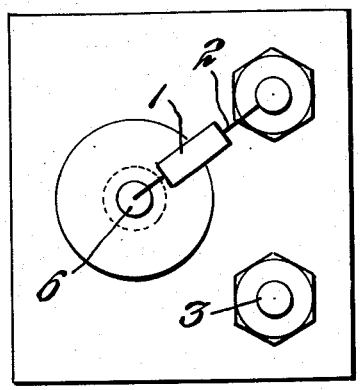
INVENTORS
HAROLD W. G. HIGNETT
PAUL HERSCH
BY C. L. Deller
ATTORNEY Patented Sept. 22, 1953

2,653,180

UNITED STATES PATENT OFFICE 2,653,180

ALKALINE STORAGE BATTERY AND PROCESS FOR PREVENTING ITS SELF-DISCHARGE

Harold W. G. Hignett and Paul Hersch, Birmingham, England, assignors to The International Nickel Company, Inc., New York, N. Y., a corporation of Delaware Application June 7, 1952, Serial No. 292,272
In Great Britain June 22, 1951

5 Claims. (Cl. 136—25)

1

The present invention relates to electric storage batteries having alkaline electrolytes and more particularly to alkaline storage batteries having a positive plate containing nickel oxide and a negative plate made of a finely-divided highly-reactive iron.

Alkaline storage batteries of the nickel-iron type were originally developed by Edison and have been in widespread use for many years. The Edison-type battery has been described in the technical literature, e. g., the book entitled "Lead-Acid and Nickel-Iron Storage Batteries," edited by L. Lyndon and published by Thomas A. Edison, Inc. (1934). In brief, these batteries comprise an alkaline accumulator having a positive plate of nickel oxide and a negative plate of finely-divided iron, which either on normal discharge or on self-discharge is converted to iron oxide. These batteries have many advantages and are especially suitable for use in applications requiring high capacity or current output available at rapid rates of discharge, absence of acid fumes, etc., and applications where the service involves rough handling and thus requires a sturdy and compact battery structure. However, the use of these Edison-type storage batteries has been limited by the well known fact that the negative plate in such batteries may suffer a loss of charge when the battery stands idle over long periods. This phenomenon is commonly denoted as "self-discharge." Often when a battery has been kept unused for several months and is then suddenly required for an emergency, it refuses to work to its full capacity. Thus, the problem presented by self-discharge is of many years standing and has prevented the utilization of this type of cell in service that calls for long periods of idleness (so-called "stand-by time") where charging facilities were not available. In installations where charging facilities were available during periods of idleness, these batteries could be periodically or more or less continuously recharged, e. g., by receiving a trickle charge. For many years there has been a need for some method of preventing the self-discharge of these batteries so that they could be used in those fields where their advantages are important considerations, even though the type of service were such that long periods of idleness are involved and recharging the battery to compensate for the loss due to idleness is not practicable and/or is not possible due to lack of facilities or a source of electricity. Although many attempts were made to overcome the foregoing difficulties and other disadvantages, none, as far as we are aware, was

2 entirely successful when carried into practice commercially on an industrial scale.

It has now been discovered that the self-discharge during periods of idleness of Edison-type storage batteries can be prevented in a simple and economical manner which obviates the necessity of maintaining charging installations.

It is an object of the present invention to provide an Edison-type alkaline storage battery which will not lose its charge during prolonged periods of idleness.

The invention also contemplates providing an alkaline storage battery having a negative electrode of highly-reactive iron that will not lose its charge during prolonged periods of idleness.

It is a further object of the invention to provide an improved electric storage battery of the Edison type which will be able to operate at full capacity after prolonged periods of inactivity without any intermittent charging operations to overcome the self-discharge normally associated with this type of cell.

The invention further contemplates providing a method for preventing the self-discharge of alkaline storage batteries having a negative electrode of highly-reactive iron.

Another object of the invention is to provide a method for preventing the self-discharge of alkaline storage batteries having a positive electrode comprising nickel oxide and a negative electrode comprising highly-reactive iron.

Other objects and advantages will become apparent from the following description taken in conjunction with the accompanying drawing in which:

Figures 1 and 2 illustrate respectively a front and plan view of a battery in accordance with the invention.

The present invention contemplates an alkaline storage battery of the Edison type, i. e., an accumulator having an alkaline electrolyte, having nickel oxide as the active material of the positive plate, having finely-divided highly-reactive iron as the active material of the negative plate and having in electrical connection with the iron plate an auxiliary zinc electrode which is itself inserted in the electrolyte to form an auxiliary circuit with the reactive iron electrode. This auxiliary circuit is formed by electrically connecting the zinc electrode to the iron electrode and completing the circuit through the alkaline electrolyte. Thus, it is evident that the two electrodes of the auxiliary circuit are connected through the electrolyte and also through a connection (herein referred to as the "electrical"

connection) which is other than a connection formed by the electrolyte. The electrical connection can take any form well known or apparent to those skilled in the art, e. g., a wire external of the electrolyte, a wire in the electrolyte but insulated therefrom, a salt-bridge, etc. The self-discharge of the negative iron plate is prevented by the auxiliary circuit. During periods of idleness some zinc dissolves in the electrolyte (forming zincate) while electrons flow through the electrical connection from the zinc toward the iron plate. These electrons counteract the tendency of the iron to lose electrons and thereby self-discharge. In order to use the zinc economically, a resistance is usually employed in the connection between the zinc and the iron in order to avoid a wasteful amount of current in the auxiliary circuit. The magnitude of the resistance chosen depends on the capacity and susceptibility to self-discharge of the negative plate to be protected. During the discharge of the battery in service it is not necessary to break the connection between the zinc and the iron electrode.

The amount of zinc necessary to prevent the self-discharge of the battery will be dependent upon the characteristics of the original battery selected, i. e., the size and physical structure of the electrodes, electrolyte strength, etc. The amount of zinc used may be somewhat larger than the amount of iron saved from self-discharge but the expenditure of zinc is quite negligible compared with the advantage gained, i. e., having a fully charged battery even after long periods of standing.

In carrying the invention into practice, the zinc of the auxiliary anode is preferably amalgamated on the surface whereby it is protected from direct attack by the electrolyte utilized in the Edison type of alkaline battery. The amalgamation can be readily achieved by dipping the zinc into mercury. Prior to this dipping the oxide skin normally adhering to zinc can be removed by washing with a solution of caustic potash.

Of course, the auxiliary zinc electrode should preferably not contain, nor make contact with, metal of low hydrogen overpotential since otherwise the auxiliary metal itself would tend to corrode. For practical purposes, a water line around the zinc should be sleeved off or otherwise protected.

The auxiliary electrode may be inserted anywhere in the electrolyte but should, of course, not make contact with the positive plate of the battery nor with the case if this is made of steel, nickel-coated steel, etc. Provision may be made for replacement of the electrode material, in which case, the auxiliary electrode will be fixed in such a way as to make access to it easy.

When constructing an alkaline storage battery embodying the concepts of the present invention, it is preferred that the resistance between the auxiliary anode and the negative iron plate be such that the resultant current flowing in the auxiliary circuit will be only enough to overcome the average self-discharge characteristic of said storage battery.

Referring now to the drawing illustrating an embodiment of the invention, Figure 1 is a front and Figure 2 a plan view of a battery in accordance with this invention.

1 is a carbon resistance soldered to the top of the zinc rod 6 comprising a wire 2 which leads to the negative terminal. 3 is the positive terminal rod carrying the positive tubes. 4 is a rubber sleeve which prevents the zinc from corroding at the water line. 5 shows the level of the electrolyte. 7 and 8 are the negative plates and positive tubes, respectively.

The present invention is applicable to alkaline storage batteries of the Edison type. It is particularly applicable to batteries of this type when the contemplated service is such that it involves prolonged periods of idleness.

It is to be observed that the present invention provides an improved alkaline storage battery having an auxiliary zinc electrode inserted in the battery electrolyte and in electrical circuit with the negative (iron) plate of the battery. Moreover, the invention provides a method for preventing the self-discharge of the highly reactive iron plate of an Edison-type alkaline storage battery.

The present invention which refers to secondary batteries is not to be confused with primary batteries in which an auxiliary zinc electrode may be provided in conjunction with a negative also made of zinc. In such primary batteries the role of the auxiliary zinc is to prevent passivity of the zinc negative on discharge, while in the case of the present invention the zinc has the function of suppressing chemical activity of the iron during periods of idleness. The electrochemical mechanism by which these two entirely different aims are achieved are also entirely different. The zinc-by-zinc activation is due to an electromotive force set up by concentration gradients and is not accompanied by hydrogen evolution on the negative as in the present case.

The auxiliary anode of the present invention is utilized to form an auxiliary primary cell with the iron electrode to generate a current which serves to preserve the highly active nature of the iron while the cell is idle. It is commonly believed that iron is immune to aqueous alkaline solutions; but in the finely-divided and active condition, iron does, in fact, oxidize when immersed in the alkali and thereby loses its charge. This can, however, be prevented in accordance with the invention if a piece of zinc is inserted in the electrolyte and is electrically connected to the iron negative plate of the battery. The electrons expelled from the zinc and arriving at the iron produce at the latter a small amount of hydrogen, which process prevents the self-discharge of the iron plate while the battery stands idle. Thus, the improvement in battery structure contemplated by the present invention functions as an auxiliary primary cell inserted within a secondary battery.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:

1. As a new article of manufacture, an alkaline storage battery of the Edison type containing an auxiliary zinc electrode electrically connected to the negative iron electrode, said connection including a resistance element for regulating current flowing between the zinc electrode and the iron electrode to substantially counteract self-discharge of said alkaline battery.

2. A method for substantially preventing the self-discharge of an alkaline battery of the Edison type comprising electrically connecting an auxiliary zinc electrode to the negative iron electrode of said battery and immersing said zinc electrode in the alkaline electrolyte of the battery to form with the electrolyte an auxiliary circuit and to cause a current to flow in said auxiliary circuit between said zinc and said iron electrodes.

3. A method for substantially preventing the self-discharge of an alkaline battery of the Edison type comprising immersing an auxiliary zinc electrode in the alkaline electrolyte of said battery and electrically connecting said auxiliary zinc electrode to the negative iron plate of said battery through a resistance element for controlling the current flowing between the zinc electrode and the iron plate in the auxiliary circuit formed with the electrolyte to substantially counteract self-discharge of said battery without excessive consumption of said zinc electrode.

4. As a new article of manufacture, an alkaline storage battery having a positive nickel oxide plate, a negative iron plate and a zinc electrode in electrical connection with said iron plate and forming therewith during periods of idleness an auxiliary circuit completed through the alkaline electrolyte to prevent self-discharge of said iron plate.

5. As a new article of manufacture, an alkaline storage battery having a positive nickel oxide plate, a negative iron plate and an amalgamated zinc electrode in electrical connection with said iron plate and forming therewith during periods of idleness an auxiliary circuit completed through the alkaline electrolyte to prevent self-discharge of said iron plate.

HAROLD W. G. HIGNETT.
PAUL HERSCH.

References Cited in the file of this patent

UNITED STATES PATENTS

| Number | Name | Date |
|---|---|---|
| 726,468 | Scott | Apr. 28, 1903 |

FOREIGN PATENTS

| Number | Country | Date |
|---|---|---|
| 434,417 | Great Britain | Aug. 22, 1935 |
| 452,842 | Great Britain | Aug. 31, 1936 |